(12) United States Patent
Zwart et al.

(10) Patent No.: US 10,027,514 B2
(45) Date of Patent: Jul. 17, 2018

(54) TRANSMITTING SIGNALS BETWEEN MODULES

(71) Applicant: Cirrus Logic International Semiconductor Ltd., Edinburgh (GB)

(72) Inventors: Willem Zwart, Edinburgh (GB); Bhupendra Singh Manola, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 181 days.

(21) Appl. No.: 14/928,766

(22) Filed: Oct. 30, 2015

(65) Prior Publication Data

US 2016/0269201 A1    Sep. 15, 2016

Related U.S. Application Data

(60) Provisional application No. 62/130,233, filed on Mar. 9, 2015.

(30) Foreign Application Priority Data

May 18, 2015 (GB) .................................. 1508525.1

(51) Int. Cl.
*H04L 25/02* (2006.01)
*H04L 5/16* (2006.01)
(Continued)

(52) U.S. Cl.
CPC .......... *H04L 25/0276* (2013.01); *H04B 3/30* (2013.01); *H04L 5/1461* (2013.01); *H04L 5/16* (2013.01)

(58) Field of Classification Search
CPC ..... H04L 25/0276; H04L 5/1461; H04L 5/16; H04B 3/30
See application file for complete search history.

(56) References Cited

U.S. PATENT DOCUMENTS 5,781,028 A    7/1998   Decuir
6,542,946 B1   4/2003   Wooten
(Continued)

OTHER PUBLICATIONS

Combined Search and Examination Report under Sections 17 and 18(3), UK Patent Application GB1508525.1, dated Oct. 29, 2015, 5 pages.
(Continued)

*Primary Examiner* — Edan Orgad
*Assistant Examiner* — Nourali Mansoury
(74) *Attorney, Agent, or Firm* — Jackson Walker L.L.P.

(57) ABSTRACT

A system comprises a first module and a second module, connected by a transmission line comprising first and second wires. The first module includes common mode voltage circuitry, for imposing a common mode voltage onto the first and second wires. The first module includes signal generation circuitry, for generating a signal voltage in response to first data, and for imposing the signal voltage as a differential signal onto the first and second wires during periods when the first module has first data to transmit. The second module includes current generation circuitry, for generating a signal current in response to second data, and for injecting the signal current as a differential current onto the first and second wires during periods when the second module has second data to transmit. The first module includes respective resistances connected to the first and second wires. The first module includes a first detector for obtaining first output data based on voltages across the resistors resulting from the signal current injected by the current generation circuitry of the second module; and the second module includes a second detector for obtaining second output data based on differential signal imposed by the signal generation circuitry of the first module.

14 Claims, 9 Drawing Sheets

(51) Int. Cl.
*H04L 5/14* (2006.01)
*H04B 3/30* (2006.01)

(56) References Cited

U.S. PATENT DOCUMENTS

| | | | |
|---|---|---|---|
| 6,864,704 | B1 | 3/2005 | Wong et al. |
| 2011/0194592 | A1 | 8/2011 | Weng |
| 2012/0133430 | A1* | 5/2012 | Cellier .................... H03F 1/305 330/69 |
| 2012/0146604 | A1* | 6/2012 | Seki ...................... H02M 3/158 323/282 |
| 2013/0188622 | A1* | 7/2013 | Kim ...................... H04W 72/04 370/336 |
| 2014/0162727 | A1 | 6/2014 | Saito et al. |
| 2014/0340144 | A1 | 11/2014 | Takeda |

OTHER PUBLICATIONS

International Search Report and Written Opinion, International Patent Application No. PCT/GB2015/053268, dated Dec. 17, 2015, 14 pages.

* cited by examiner

US 10,027,514 B2

TRANSMITTING SIGNALS BETWEEN MODULES

FIELD OF DISCLOSURE

This relates to a system for transmitting bidirectional data between a first module and a second module.

BACKGROUND

Systems are known in which it is a requirement to transmit data from a first device to a second device, and from the second device to the first device, over a single transmission line. Thus, in half-duplex systems, there are periods during which the first device is able to transmit data, and periods during which the second device is able to transmit data.

In such systems, it is necessary to be able to transmit data signals from the first device to the second device, and to be able to detect the signals in the second device, and to be able to transmit data signals from the second device to the first device, and to detect the signals in the first device.

In such systems it may be desirable to ensure that the transmission lines are terminated with an impedance matching the characteristic impedance of the transmission line to reduce reflections of the signal on either end of the transmission line.

U.S. Pat. No. 5,781,028 describes a Universal Serial Bus (USB) interface, with respective terminations coupled to the two ends of a data cable, with the possibility to selectively activate the terminations. For a USB bus, the switching of transmission direction is relatively infrequent, but for other applications such as bidirectional transmission of digital audio streams the direction of transmission may be desired to be much more frequent to meet targets of signal latency. Each reversal of direction requires careful synchronisation and timing margin for the switching activity to cope with various possible transmission distances during which the bus can not transmit useful data, and requires power to switch large low-resistance switches. Also, each reversal of direction may cause Electromagnetic Interference emissions.

SUMMARY

According to a first aspect of the present invention, there is provided a system comprising a first module and a second module, connected by a transmission line comprising first and second wires, wherein the first module includes common mode voltage circuitry, for imposing a common mode voltage onto the first and second wires; the first module includes signal generation circuitry, for generating a signal voltage in response to first data, and for imposing the signal voltage as a differential signal onto the first and second wires during periods when the first module has first data to transmit; the second module includes current generation circuitry, for generating a signal current in response to second data, and for injecting the signal current as a differential current onto the first and second wires during periods when the second module has second data to transmit; the first module includes respective resistances connected to the first and second wires; the first module includes a first detector for obtaining first output data based on voltages across the resistors resulting from the signal current injected by the current generation circuitry of the second module; and the second module includes a second detector for obtaining second output data based on differential signal imposed by the signal generation circuitry of the first module.

Therefore, some embodiments have the advantage that they can operate with rapid direction switching, avoiding wasting transmission capacity because the common-mode voltage on the line is always well defined, even between periods when both devices are inactive. Because the common-mode voltage is always defined by the same device, there are no transients in common-mode voltage and hence no consequent EMI emissions. The average power consumption of the bus drivers is also reduced as there is no standing current flowing in the line when transmitting in one of the directions. Either end of the link may be placed into a high impedance state without the need for large low-resistance switches in the data signal path, thus facilitating multiplexing at either end to accommodate other signal source, for example to make compatible with legacy connector configurations.

Thus, certain embodiments combine, for a bi-directional differential communications system, the ability of a shunt terminated transmission to quickly change the direction of communication over the cable, with a significant part of the inherent advantage in power consumption of a series terminated transmission line without the requirement to have switches in the signal path, switching between respective mode of operation, while maintaining the ability to effectively counter signal reflections and control the common mode signal level in either direction.

BRIEF DESCRIPTION OF THE DRAWINGS

Embodiments of the invention will now be described by way of example only with respect to the accompanying drawings, of which.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

DETAILED DESCRIPTION

Figure 1A:
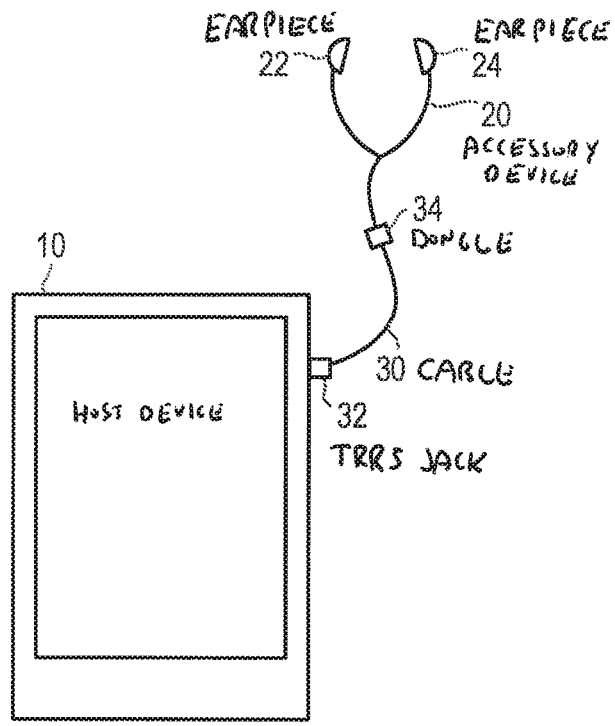
FIG. 1(a) illustrates a first audio system.

FIG. 1(a) shows an audio system, as just one example of a system using the methods described herein.

Specifically, FIG. 1 shows a host device 10, which in this example takes the form of a smartphone, but which may be any device. The circuits and method described here may be used in situations where the host device is a portable audio device, but may also be used in other situations. In this example, the host device has audio processing capability.

FIG. 1(a) also shows an accessory device 20, which in this example takes the form of a pair of earphones, but which may be any device. In this example, the pair of earphones has two earpieces 22, 24, each of which includes a speaker for reproducing sound in response to audio signals transferred from the host device 10. Each of the earpieces 22, 24 also includes at least one microphone, for example for detecting ambient noise in the vicinity of the wearer.

Signals representing the ambient sound are then transferred from the earphones to the host device 10, which performs a noise cancellation function using an algorithm and generates anti-noise signals that it transfers to the earphones for playback. The effect of playing back the anti-noise signals is that the level of ambient noise heard by the wearer is reduced, and the wanted sounds (music, speech, or the like) that are also being transferred from the host device 10 are therefore more audible.

Thus, data is transmitted bidirectionally, from the host device to the accessory device, and from the accessory device to the host device. As noted above, there are multiple situations in which this requirement exists, and FIG. 1 shows just one example of such a system.

The accessory device 20 is connected to the host device 10 by means of a cable 30. In one example, the cable 30 may be provided with a conventional 4-pole TRRS jack 32, while the host device 10 is provided with a matching 4-pole socket. In other examples, the cable may be in any suitable format, for example it may be a USB Type-C connector, which similarly has four poles available for an audio interface. As a further alternative, the accessory device (or the host device) may be provided in a USB Stick dongle, with data being transferred between the dongle and the other device over a USB-compliant wired communications link. These are simply examples of transmission lines that can be used to carry bidirectional data between two devices.

FIG. 1 also shows a dongle 34 in the cable 30. In one embodiment, a bidirectional data bus extends between a first module in the host device 10 and a second module in the dongle 34. Separate signal wires connect the speakers and microphones in the earpieces 22, 24 to the module in the dongle 34.

Figure 1B:
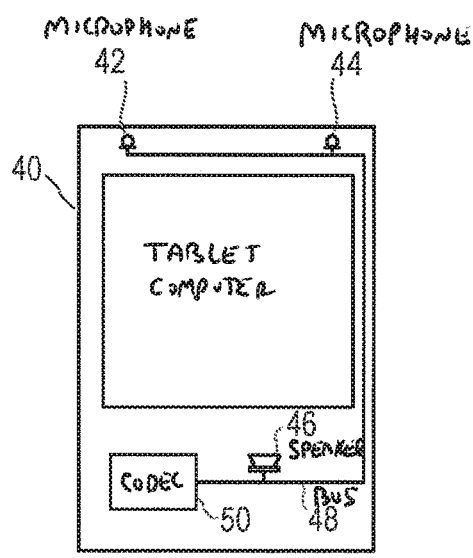
FIG. 1(b) illustrates a second audio system.

FIG. 1(b) shows an audio system, as another example of a system using the methods described herein. Specifically, FIG. 1(b) shows a device in the form of a tablet computer 40, by way of example, having microphones 42, 44 and a speaker 46, connected by a bus 48 to a codec 50. In this example, a first module is provided in the codec 50, and a respective second module is provided in each of the microphones 42, 44 and speaker 46. The bus 48 within the device 40 may be provided on a printed circuit board, or by separate wires or connectors.

Figure 2:
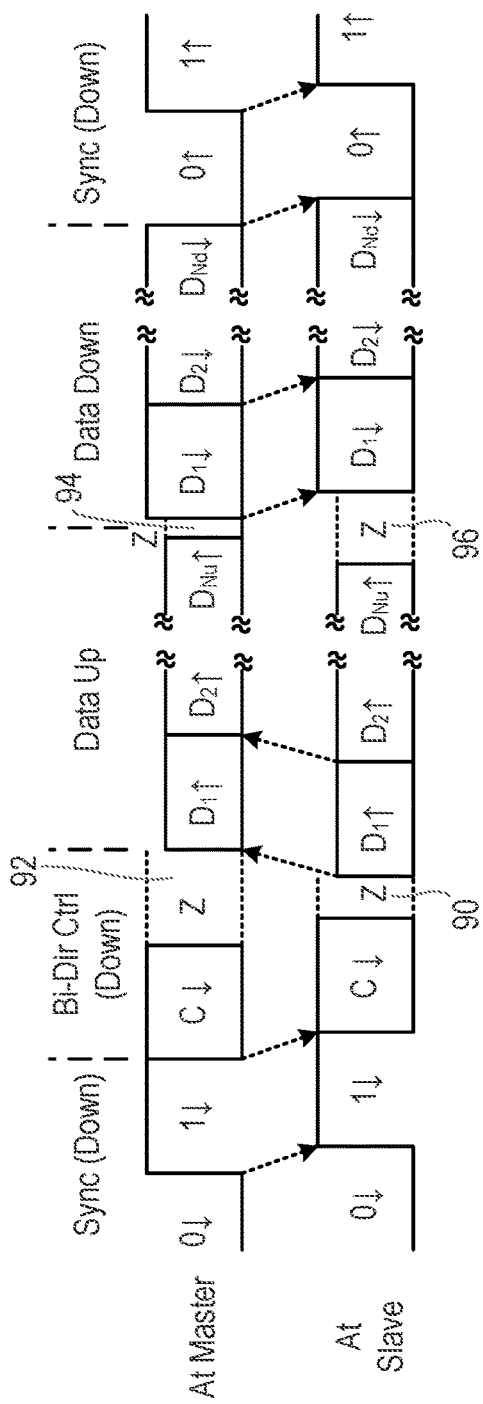
FIG. 2 illustrates a first data transmission format.

FIG. 2 illustrates one example of the timing of signals between the host (referred to here as the master) and the accessory (referred to here as the slave). Again, FIG. 2 shows just one illustrative example of the type of system in which bidirectional data is sent between two modules. In this example, there is a half-duplex connection between the two modules. That is, data is transmitted from the first module to the second module during first time periods, and data is transmitted from the second module to the first module during second time periods, where the second time periods are different from the first time periods.

In the example illustrated in FIG. 2, time is divided into superframes, and each superframe is divided into frames. Each frame is further divided into time slots. FIG. 2 shows the structure of one frame, during which data is transmitted from the first module to the second module, and from the second module to the first module.

In this example, each frame contains two sync symbols (namely a 0 followed by a 1), transmitted from the master to the slave, then a control symbol (C) which may be transmitted in either direction, then a series of data symbols $D_{1\uparrow}$, $D_{2\uparrow}$, ..., $D_{Nu\uparrow}$ transmitted from the slave to the master, and a series of data symbols $D_{1\downarrow}$, $D_{2\downarrow}$, ..., $D_{Nd\downarrow}$ transmitted from the master to the slave. A transmission delay applies to transmissions in both directions. Symbols transmitted from the slave to the master are illustrated with slightly lower heights than symbols transmitted from the master to the slave, but this is simply for illustrative purposes and has no physical meaning.

Specifically, FIG. 2 illustrates the case in which the bidirectional control slot is allocated for transmission of control data from the master to the slave. In this case, the slave receives the control symbol $C_\downarrow$, and then transmits the first data up symbol $D_{1\uparrow}$ after a delay indicated by the reference numeral 90. Because of the transmission delays in both directions and the delay 90 within the slave, there is a delay indicated by the reference numeral 92 between the time at which the master transmits the control symbol and the time at which the master receives the first data up symbol.

Data from the master to the slave is transmitted synchronous to a master symbol transmission clock (not illustrated) corresponding to a symbol period. Thus when the direction of data transfer is reversed again, the first data symbol down is not transmitted until a whole number of symbol periods since the previous symbol transmitted down (in this case the control symbol $C_\downarrow$ sent just prior to delay 92. Thus there is a further delay 94 between when the master receives the last data up symbol until it transmits the first data down symbol. Because of the transmission delays in both directions and this additional delay 94, there is a delay indicated by the reference numeral 96 between the time at which the slave transmits the last data up symbol and the time at which the slave receives the first data down symbol.

Thus, there is a delay at each module when the direction of data flow is changed. The two delays 92, 94 seen at the master module have the same total length as the two delays 90, 96 seen at the slave module. In this example, these two delays, in each case, total one symbol period $t_{symbol}$. Because there are only two such reversals of the data transfer direction in each frame, the total time associated with the transmission delay is smaller than it would be with more direction changes.

Figure 3:
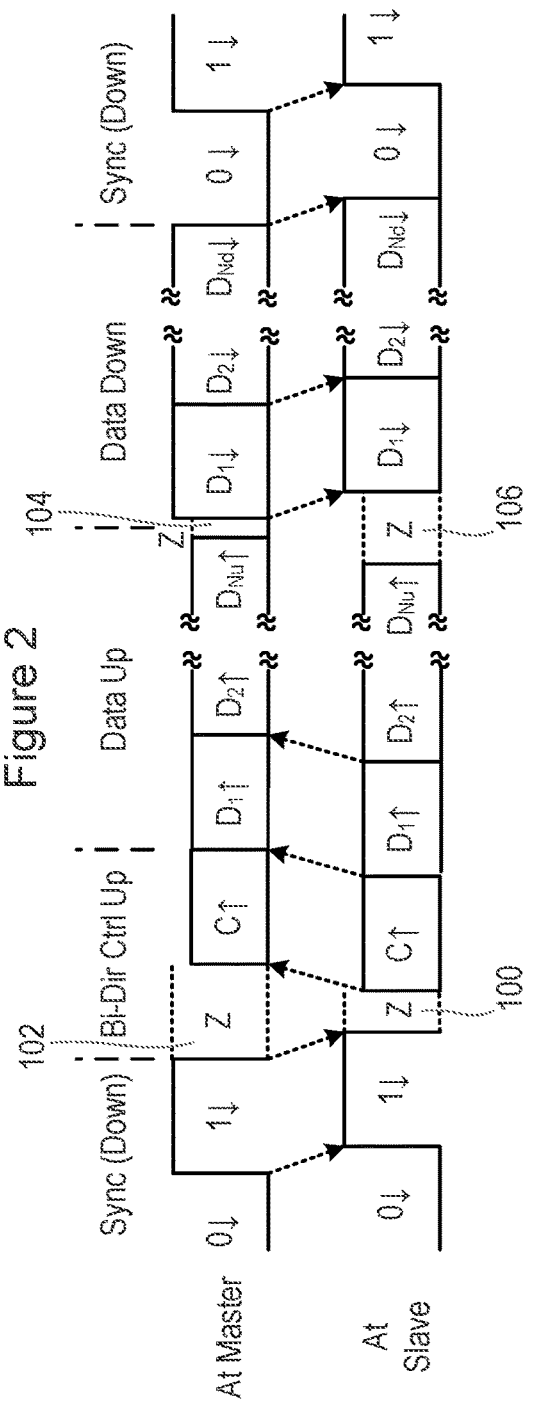
FIG. 3 illustrates a second data transmission format.

FIG. 3 illustrates another example of the timing, with the same frame structure as in FIG. 2, but in the case in which the bidirectional control slot is allocated for transmission of control data from the slave to the master.

In this case, the slave receives the second sync symbol ($1_\downarrow$), and then transmits the control data symbol after a delay indicated by the reference numeral 100. Because of the transmission delays in both directions and the delay 100 internal to the slave, there is a delay indicated by the reference numeral 102 between the time at which the master transmits the second sync symbol and the time at which the master receives the control symbol.

There is in this case no need for a delay between the transmission of the control symbol $C_\uparrow$ and the first data up symbol $D_{1\uparrow}$. There is a further delay only when the direction of data transfer is reversed, That is, when the master receives the last data up symbol, it transmits the first data down symbol after a delay indicated by the reference numeral 104 due to waiting for the next edge of the master symbol transmission clock. Because of the transmission delays in both directions and this delay 104, there is a delay indicated by the reference numeral 106 between the time at which the slave transmits the last data up symbol $D_{Nu\uparrow}$ and the time at which the slave receives the first data down symbol $D_{1\downarrow}$.

Figure 5:
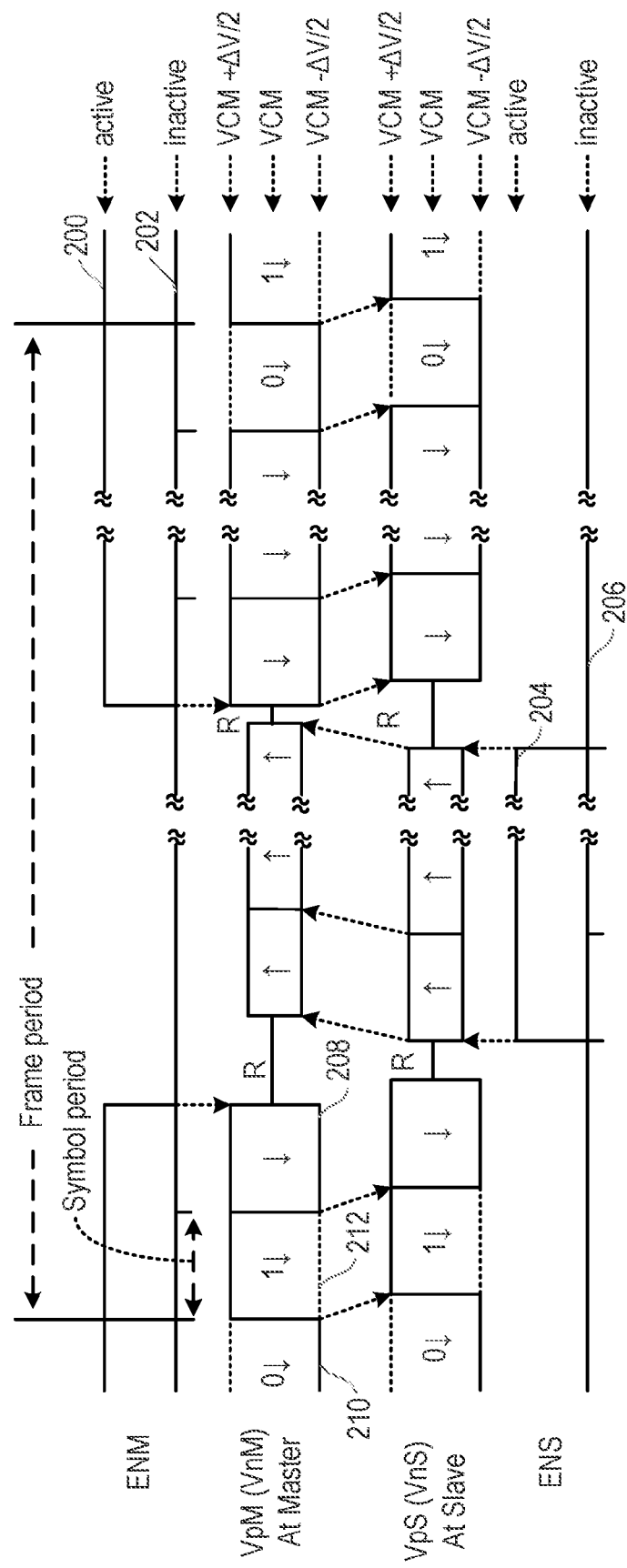
FIG. 5 illustrates signals transmitted in the system of FIG. 4.

Again, there is a delay at each module when the direction of data flow is changed, and there are only two such direction changes in each frame, even though the control symbol is in the opposite direction to that shown in FIG. 5. The two delays 102, 104 seen at the master module have the same total length as the two delays 100, 106 seen at the slave module. Again, these two delays, in each case, total one symbol period $t_{symbol}$. This ensures that a maximally large portion of the frame period can be used effectively for transferring data, inherently optimizing the number of data symbols that can be transferred per unit of time, given the constraints for latency and the required overhead to synchronize two modules on either side of the interface. As a consequence of the ordering of the symbol slots as described, the direction of the data in the control symbol has no impact on the maximal number of data symbols that can be transferred per unit of time.

Figure 4:
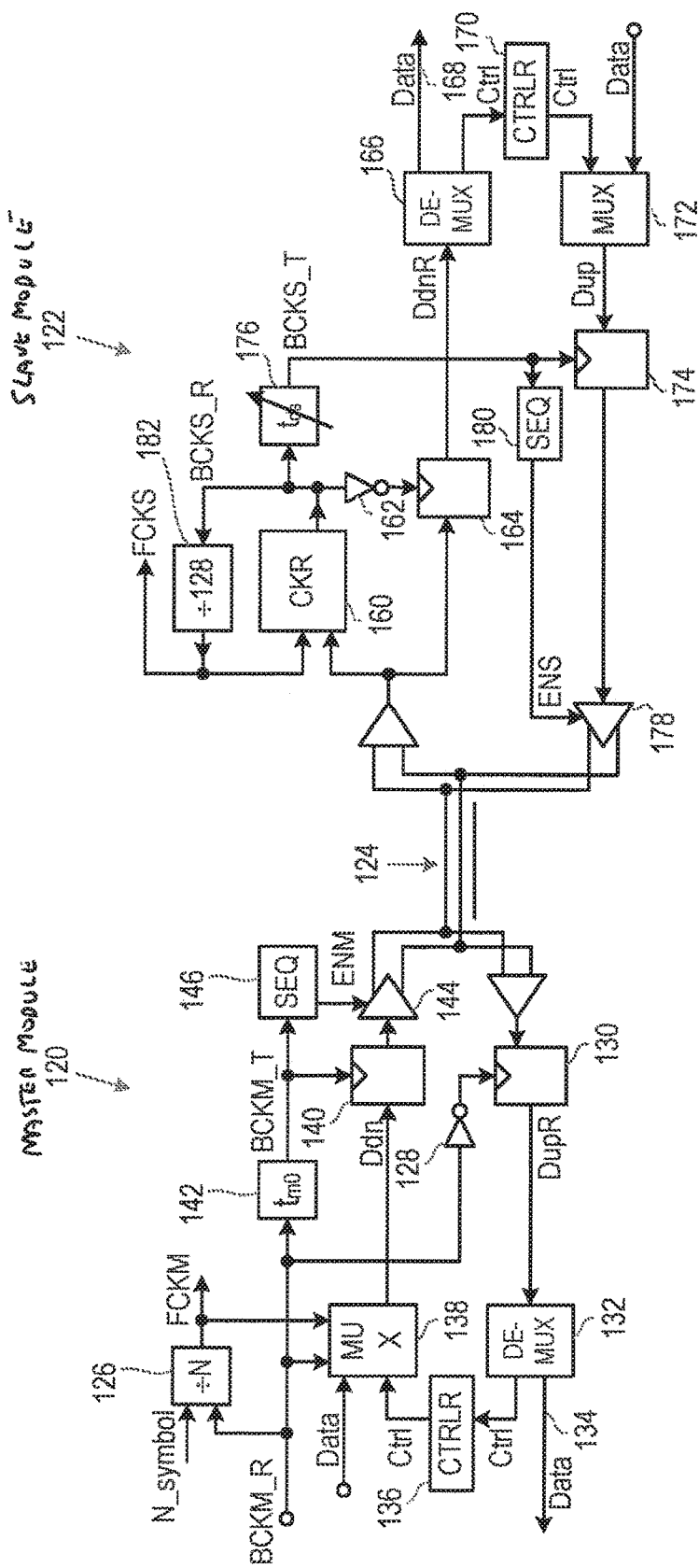
FIG. 4 illustrates an example of a system for transmitting and receiving data.

FIG. 4 shows an embodiment of a system of the type shown in FIG. 1, showing a master module 120 and a slave module 122, connected by a bus 124.

The bus 124 may for example comprise a twisted pair of wires inside a common shield.

In this embodiment, the timing on the master side is set by a master clock BCKM_R, at the symbol rate, and the frame clock FCKM is obtained by dividing that clock in a divider 126 by the number of symbols per frame, N_symbol. (In other embodiments FCKM may be supplied as a master clock and BCKM_R generated therefrom by a clock multiplier, or both clocks may be divided down from some higher-frequency master clock).

The phase of the BCKM_R clock corresponds to the timing at which the master module 120 expects to receive data symbols from the slave module 122. Thus, the BCKM_R clock signal is supplied through an inverter 128 to a receive block 130, which receives data transmitted from the slave. This data contains traffic data and control data, and so the received signal is passed to a demultiplexer 132, which supplies the traffic data on an output 134, and supplies the control data to a controller 136.

When the master side is transmitting data, control data from the controller 136 is multiplexed in a multiplexer 138 with the traffic data to be transferred, and supplied to an output register 140. The BCKM_R clock is passed through a delay block 142 to generate clock pulses BCKM_T whose phase corresponds to the timing at which the master module 120 intends to transmit data symbols. The BCKM_T clock signal is then used to latch the output data from the output flip-flop 140 to a buffer 144. The buffer 144 is controlled by a sequencing block 146, which, with knowledge of which symbol slots in a frame are allocated for transmission from the master to the slave, enables data to be passed through the buffer 144 during the correct time slots.

When data is received at the slave side, the pulses are passed to clock recovery circuit 160. As mentioned previously, the presence of the sync pattern once in each frame allows the synchronization of the slave to the master to be maintained. The clock recovery circuit 160 may for example include a phase-locked loop, with a voltage controlled oscillator generating a clock signal BCKS_R as a multiple of (in this example, 128 times) the frequency of the recovered frame clock FCKS, BCKS_R corresponding to the timing at which the slave module 122 expects to receive data symbols from the master module 120. Thus, the BCKS_R clock signal is supplied through an inverter 162 to a receive block 164, which receives data transmitted from the master. This data contains traffic data and control data, and so the received signal is passed to a demultiplexer 166, which supplies the traffic data on an output 168, and supplies the control data to a controller 170.

When the slave side is transmitting data, control data from the controller 170 is multiplexed in a multiplexer 172 with the traffic data to be transferred, and supplied to an output register 174. The BCKS_R clock is passed through a delay block 176 to generate clock pulses BCKS_T whose phase corresponds to the timing at which the slave module 122 intends to transmit data symbols. The BCKS_T clock signal is then used to latch the output data from the output register 174 to a buffer 178. The buffer 178 is controlled by a sequencing block 180, which, with knowledge of which symbol slots in a frame are allocated for transmission from the slave to the master, enables data to be passed through the buffer 178 during the correct time slots.

The recovered clock BCKS_R, at the symbol rate, is also passed to a divider 182 to obtain a frame clock FCKS by dividing it by the number of symbols per frame.

FIG. 5 shows, schematically, various control signals, and the signals being transmitted in the system.

Specifically, FIG. 5 shows the enable signals ENM and ENS, that are generated in the master module and the slave module respectively based on the control data. Thus, the master enable signal ENM takes a high value 200 when the master module 120 is active, i.e. when the master module is able to transmit on the bus 124, and takes a low value 202 when the master module is inactive. The slave enable signal ENS takes a high value 204 when the slave module 122 is active, i.e. when the slave module is able to transmit on the bus 124, and takes a low value 206 when the slave module is inactive.

FIG. 5 illustrates the situation corresponding to that shown in FIG. 2, in which the control data bit 208 following the sync bits 210, 212 is transmitted from the master module to the slave module, and thus represented in FIG. 5 by a down arrow.

Figure 6:
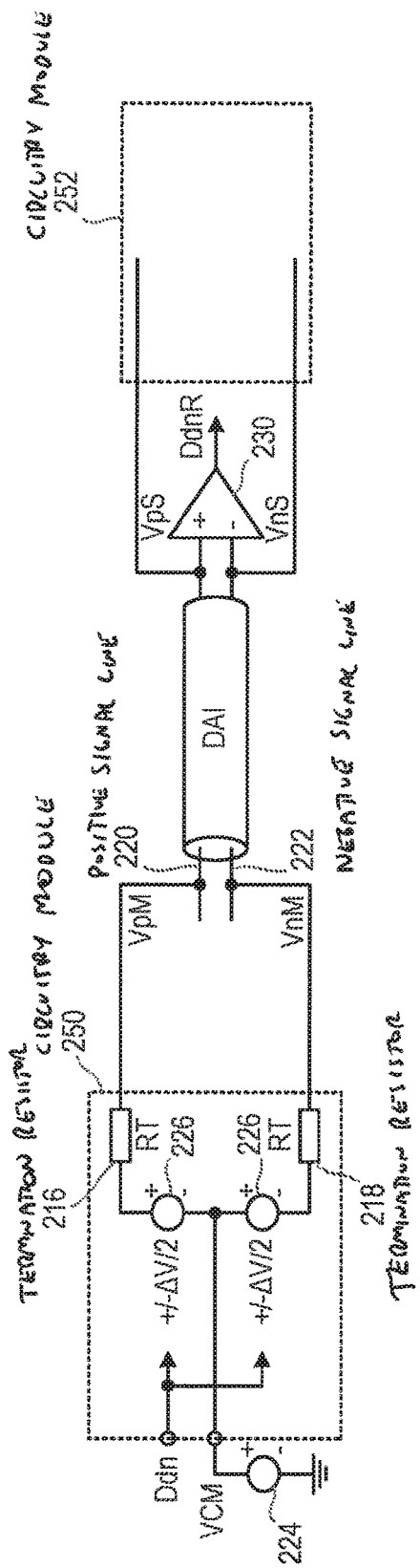
FIG. 6 illustrates a part of the system of FIG. 4 in a first mode of operation.

FIG. 6 shows the form of the circuitry module 250 used to transmit data from the master module 120 to the slave module 122 over the bus 124.

Specifically, the master module transmission circuitry 250 includes a first termination resistor 216 connected to a positive signal line 220 of the bus, and also includes a second termination resistor 218 connected to a negative signal line 222 of the bus. The voltage seen at the master side of the positive signal line 220 is denoted VpM, the voltage seen at the slave side of the positive signal line 220 is denoted VpS, the voltage seen at the master side of the negative signal line 222 is denoted VnM, and the voltage seen at the slave side of the negative signal line 222 is denoted VnS.

The master module includes a voltage source 224 that generates a voltage VCM that is used as the common mode voltage on the two lines 220, 222 of the bus. The voltage VCM is connected to the respective first input of each of two voltage addition circuit elements 226, 228, which are respectively connected through the two termination resistors 216, 218 to the positive signal line 220 and the negative signal line 222 of the bus.

The master module also derives the binary data Ddn that is to be transmitted to the slave module. The value of the binary data controls the voltage applied to the respective second input of each of the two voltage addition circuit elements 226, 228. When the data value is high, a voltage of $+\Delta V_M/2$ is applied to the second input of the voltage addition circuit element 226 and a voltage of $-\Delta V_M/2$ is applied to the second input of the voltage addition circuit element 228. When the data value is low, a voltage of $-\Delta V_M/2$ is applied to the second input of the voltage addition circuit element 226 and a voltage of $+\Delta V_M/2$ is applied to the second input of the voltage addition circuit element 228.

The output voltages of the voltage addition circuit elements 226, 228 are coupled onto the master end of the transmission line via the termination resistors 216, 218 to form the voltages VpM and VnM mentioned above. There is no resistive loading to ground on the slave end of the line or elsewhere, so the voltages are coupled without attenuation through these termination resistors and down the line to the slave module to form the voltages VpS and VnS also mentioned above.

Specifically, voltages with the values $(VCM+\Delta V_M/2)$ and $(VCM-\Delta V_M/2)$ are applied to the positive signal line 220 and the negative signal line 222, with the value applied to each line depending on the value of the binary data bit at that time.

As shown in FIG. 5, the voltages VpM and VnM at the master therefore take the values $(VCM+\Delta V_M/2)$ and $(VCM-\Delta V_M/2)$, depending on the value of the binary data bit, and the voltages VpS and VnS at the slave also take the values $(VCM+\Delta V_M/2)$ and $(VCM-\Delta V_M/2)$.

The circuitry module 252 used to transmit data from the slave module 122 to the master module 120 is switched out.

There is no resistive loading to ground on the slave end of the line or elsewhere, so the voltages are coupled without attenuation through the termination resistors and down the line to the slave module.

Detector circuitry 230 in the slave module 122 can then extract the received value of the binary data bit DdnR, based on the values of the voltages VpS and VnS at that time.

Figure 7:
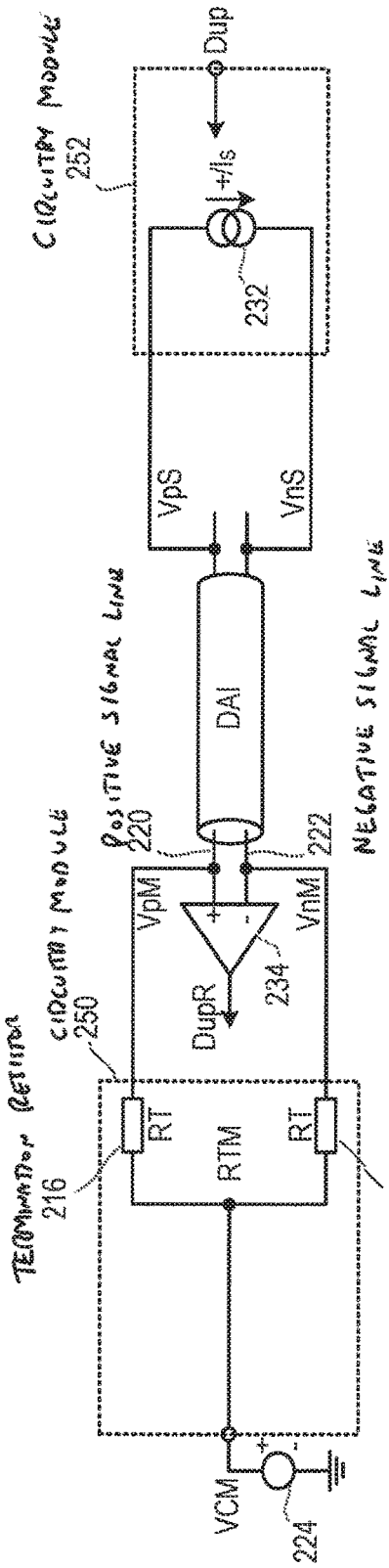
FIG. 7 illustrates a part of the system of FIG. 4 in a second mode of operation.

FIG. 7 shows the form of the circuitry module 252 used to transmit data from the slave module 122 to the master module 120 over the bus 124.

In this case, when the master transmitter is inactive, the voltage VCM generated by the voltage source 224 in the master module is applied to both of the lines 220, 222 of the bus through the respective termination resistors 216, 218.

The slave module transmission circuitry 252 includes a current source 232, which injects a current $+/-I_S$ down the transmission line. That is, a current equal to $I_S$ is injected into one of the lines 220, 222 and drawn from the other of the lines 220, 222, with the direction of current flow being determined by the value of the binary data Dup that is to be transmitted by the slave module.

The injected currents develop appropriate equal and opposite voltages across the two termination resistors 216, 218 to form the voltages VpM and VnM respectively. Thus the transmission of these currents does not disturb the common mode voltage VCM of any part of the bus.

Detector circuitry 234 in the master module 120 can then extract the received value of the binary data bit DupR, based on the values of the voltages VpM and VnM at that time.

Thus, as shown in FIG. 5, the voltages VpM and VnM at the master take values that are again approximately equal to $(VCM+\Delta V_M/2)$ and $(VCM-\Delta V_M/2)$, depending on the value of the binary data bit. In this case, the values of VpM and VnM depend on the value of the current $I_S$, and on the effective resistance seen by this current. In one embodiment, these values are chosen so that the nominal values of VpM and VnM while the slave is transmitting are the same as the nominal values of VpM and VnM while the master is transmitting.

This arrangement means that, even during the periods at each end of the bus when that end of the bus is neither receiving (taking into account transmission line delay) or transmitting, the bus common mode voltage VCM is still defined by a single source, with no times at which the wires are "floating" or being switched from being controlled from a voltage source at one end of the line to an unrelated source at the other.

The voltage levels on the bus are defined at the host side, with an impedance (namely the impedance of the termination resistor) that matches the characteristic impedance of the signal line. It should be noted that although, in this embodiment, it is the master (or host) module that imposes the common mode voltage on the bus lines, it is equally possible for the driver and termination circuitry of master and slave to be interchanged so that it is the slave (or accessory) module which defines the common mode voltage on the bus lines In this illustrated arrangement, there are no switches on the bus to cause termination impedance issues or noise coupling. Also there is no change in common mode voltage on each transmission direction reversal to cause EMI emissions.

This illustrated arrangement also has the advantage that, during transmission by the master module, no static current is flowing, as there is no DC path for the current flowing between the outputs of the master voltage drivers, and so there is no power consumption during these periods.

Figure 8:
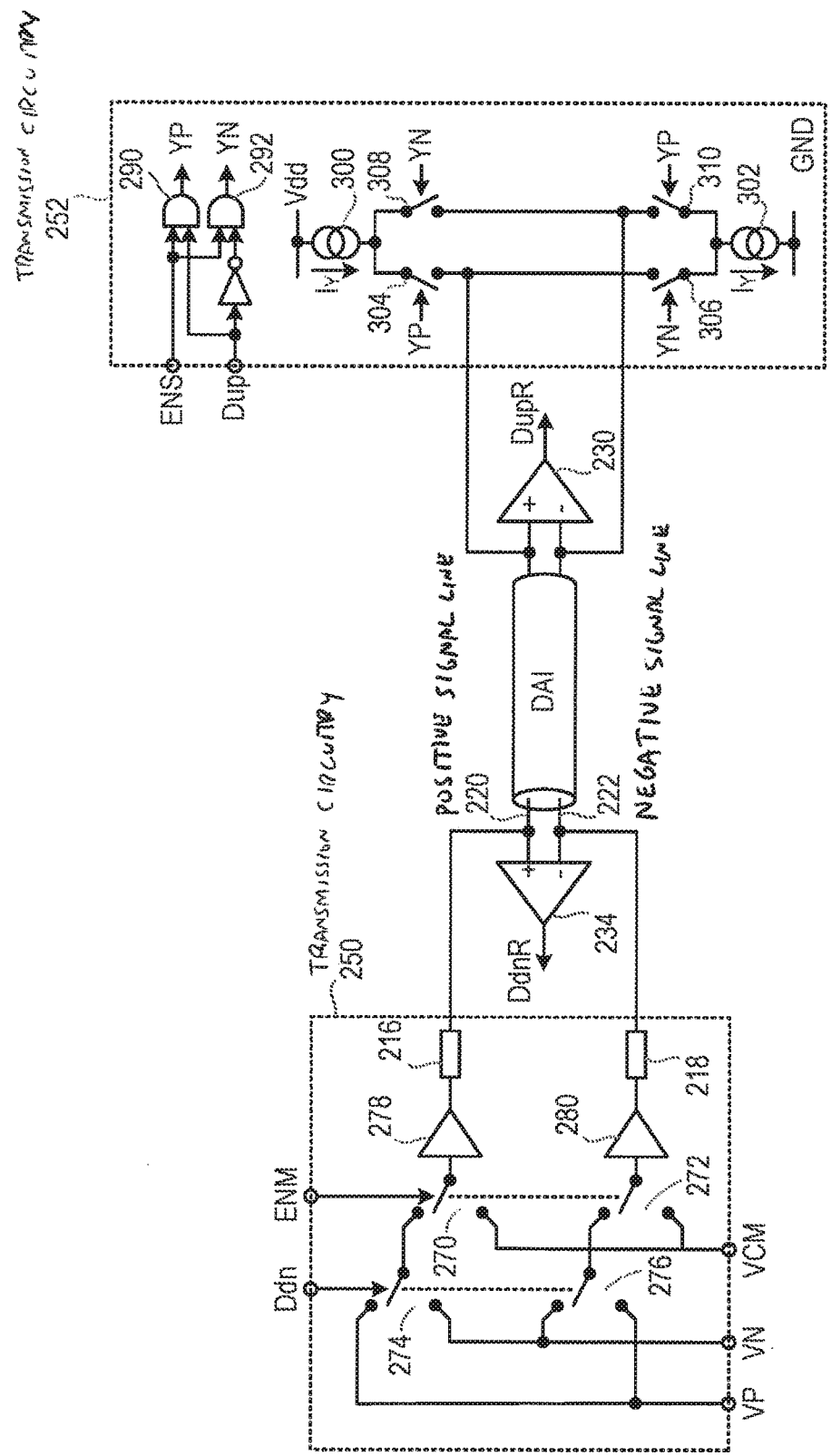
FIG. 8 illustrates in more detail a part of the system of FIG. 4.

FIG. 8 shows in more detail the form of some embodiments of the transmission circuitry 250 in the master module 120 and the transmission circuitry 252 in the slave module 122 for generating the signals described above.

The transmission circuitry 250 in the master module includes a first pair of switches 270, 272 controlled by the master enable signal ENM, and a second pair of switches 274, 276 controlled by the value Ddn of the data for transmission from the master to the slave.

A voltage VCM is connected to a respective first input terminal of each of the switches 270, 272 of the first pair.

A voltage VP, equal to $(VCM+\Delta V_M/2)$, is connected to a respective first input terminal of each of the switches 274, 276 of the second pair, while a voltage VN, equal to $(VCM-\Delta V_M/2)$, is connected to a respective second input terminal of each of the switches 274, 276.

The output terminal of each of the switches 274, 276 is connected to a respective second input terminal of each of the switches 270, 272 of the first pair.

The output terminal of each of the switches 270, 272 of the first pair is connected to a respective voltage buffer 278, 280, and the buffers 278, 280 are connected in turn to the termination resistors 216, 218 that are connected to the positive and negative signal lines 220, 222 of the bus 124.

The switches 270, 272, 274, 276 may for example be MOS switches. They may be relatively small as they are only required to drive into the high impedance inputs of the buffers 278, 280, and are not required to drive the transmission line.

The switches 270, 272, 274, 276 shown in FIG. 8 are pairs of separate two-pole switches controlled separately by the master enable signal and the data value. However, it will be appreciated that the switches 270, 274 could be replaced by one three-pole switch, and the switches 272, 276 could be replaced by another three-pole switch, with each three-pole switch controlled by a suitable logic combination of the master enable signal and the data value.

As an alternative, the voltage inputs VCM, VP and VN could be replaced by a set of relatively low-current current sources steered into resistors as appropriate under suitable switch control.

When the master enable signal ENM is low, the voltage VCM is applied through the termination resistors 216, 218 to both the positive and negative signal lines of the bus.

When the master enable signal ENM is high, and the data value Ddn is high, the voltage VP is applied through the termination resistor 216 to the positive signal line of the bus, while the voltage VN is applied through the termination resistor 218 to the negative signal line of the bus.

When the master enable signal ENM is high, and the data value Ddn is low, the voltage VN is applied through the termination resistor 216 to the positive signal line of the bus, while the voltage VP is applied through the termination resistor 218 to the negative signal line of the bus.

The voltage buffers 278, 280 may for example be MOS source follower circuits. Using Class AB devices allows a low average power to be achieved. Alternatively, using "flipped" voltage followers saves headroom and produces a lower output impedance.

The resistors 216, 218 may have values close to 0.5 times the characteristic impedance of the transmission line, in order to counter signal reflections over the transmission line. Although FIG. 8 illustrates ideal buffers 278, 280 connected to the resistors 216, 218 respectively, any real practical buffer will have a non-zero output resistance which may be significant compared to the characteristic impedance of the line and of the relevant resistor shown. The values of the resistors 216, 218 can therefore be adjusted (i.e. reduced) to take account of this. In some embodiments, the output resistance of resistors co-integrated with the active driver circuitry may equal the desired impedance, or the output resistance of the active driver circuit elements themselves may be controlled to provide the desired resistance.

The receiver circuitry 230 can be based around a standard comparator for determining the value of the transmitted data at any time. It may incorporate hysteresis, for example by using cross-coupled load devices.

The transmission circuitry 252 in the slave module includes logic circuitry for generating suitable control signals. Specifically, the slave enable signal ENS is applied to the respective first input of each of two AND gates 290, 292. The value Dup of the data for transmission from the slave to the master is applied to the second input of one AND gate 290, and is applied through an inverter 294 to the second input of the other AND gate 292.

Thus, when the slave enable signal ENS is low, both of the AND gates 290, 292 produce low outputs.

When the slave enable signal ENS is high, and the data value Dup is high, the AND gate 290 produces a high output signal YP, while the AND gate 292 produces a low output signal YN.

When the slave enable signal ENS is high, and the data value Dup is low, the AND gate 290 produces a low output signal YP, while the AND gate 292 produces a high output signal YN.

The transmission circuitry 252 in the slave module further includes two current sources 300, 302 connected in series between a supply voltage Vdd and ground (GND). The current sources 300, 302 may for example be MOS gate-driven current sources. The currents $I_Y$ generated by the current sources 300, 302 may be matched by design. The current sources 300, 302 may have high output impedances, so that the currents are independent of the local common-mode bus voltage and also independent of swings in the bus voltage.

A first parallel path between the current sources 300, 302 contains a first pair of switches 304, 306, and a second parallel path between the current sources 300, 302 contains a second pair of switches 308, 310. The switches 304, 306, 308, 310 may for example be MOS switches, and more specifically may be NMOS switches. As an alternative, the current sink switches 306, 310 may be NMOS switches, while the current source switches 304, 308 are PMOS switches, in which case the polarity of the signals driving the gates of the PMOS devices may be inverted. The switch arrangement may be current-steering, for example with the gate drives such that the common source connection voltage is roughly constant and the switch transistor stays in saturation and acts as a cascode stage.

A connection point between the switches 304, 306 is connected to the positive signal line 220 of the bus 124, while a connection point between the switches 308, 310 is connected to the negative signal line 222 of the bus 124.

The switches 304, 310 are controlled by the output signal YP generated by the AND gate 290. The switches 306, 308 are controlled by the output signal YN generated by the AND gate 292.

Thus, when the slave enable signal ENS is high, and the data value Dup is high, the AND gate 290 produces a high output signal YP, while the AND gate 292 produces a low output signal YN. In this case, the switches 304, 310 are closed, and the switches 306, 308 are opened, and so a current $I_Y$ is injected into the positive signal line 220 of the bus 124, while a current $I_Y$ is drawn from the negative signal line 222 of the bus 124.

When the slave enable signal ENS is high, and the data value Dup is low, the AND gate 290 produces a low output signal YP, while the AND gate 292 produces a high output signal YN. In this case, the switches 304, 310 are opened, and the switches 306, 308 are closed, and so a current $I_Y$ is drawn from the positive signal line 220 of the bus 124, while a current $I_Y$ is injected into the negative signal line 222 of the bus 124.

The currents on the lines 220, 222 cause voltages across the termination resistors 216, 218, and the receiver circuitry 234 can be based around a standard comparator for determining the value of the transmitted data at any time.

Figure 9:
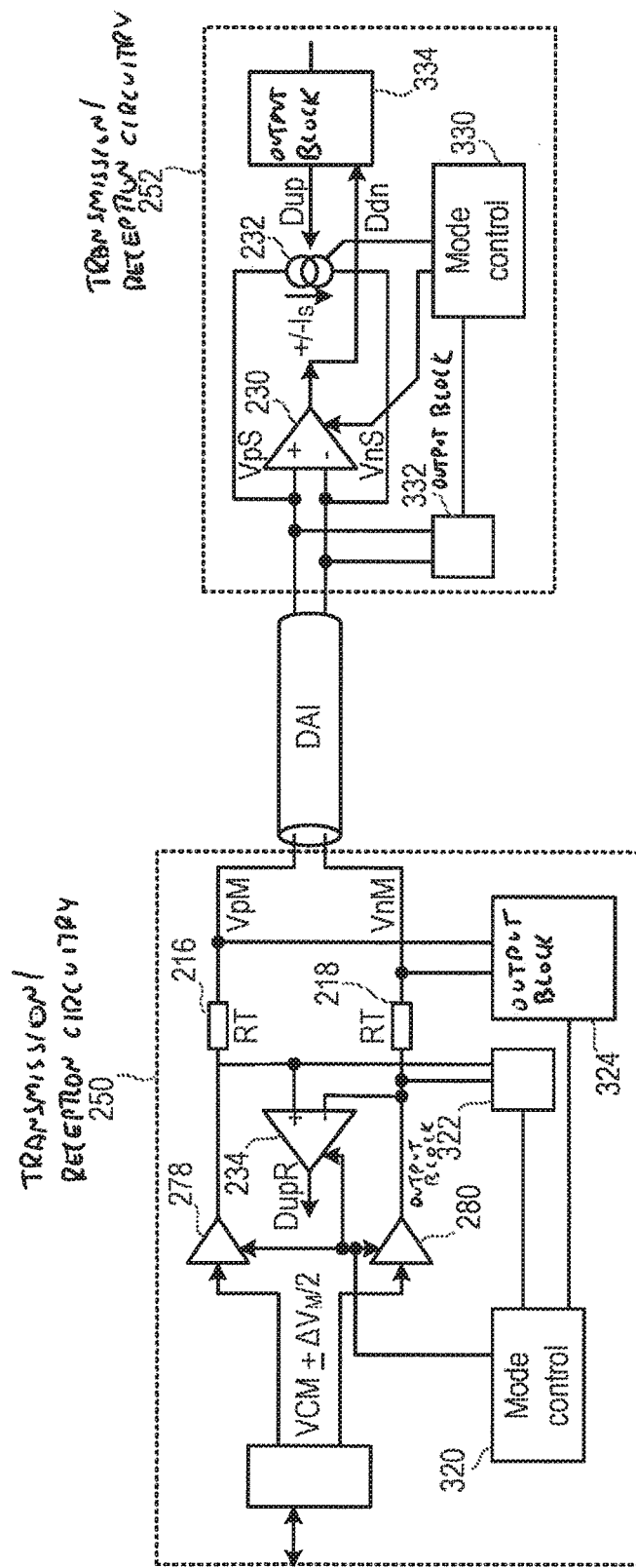
FIG. 9 illustrates a further system for transmitting and receiving data.

FIG. 9 shows the form of some embodiments of the transmission/reception circuitry 250 in the master module 120 and the transmission/reception circuitry 252 in the slave module 122 for generating the signals described above.

Features of the transmission/reception circuitry 250, 252 that correspond to features of the circuitry shown in FIGS. 6, 7 and 8 are indicated by the same reference numerals, and will not be described further herein.

The embodiments shown in FIG. 9 are of particular use in cases where the master and the slave are not permanently connected. For example, in the case where a host device can be used with different detachable accessories, and/or one accessory device can be used with different hosts.

Thus, the master module includes a mode control block 320, which can disable the voltage buffers 278, 280, so that the end becomes unterminated, and can also disable the receive circuitry 234.

Instead, other input and output blocks 322, 324 can be connected. These blocks 322, 324 can provide any desired interface. For example, the blocks 322, 324 can provide a digital interface such as USB, or can provide an analog interface, such as the Analog Accessory Adapter mode of USB-Type-C Annex A.

Similarly, the slave module includes a mode control block 330, which can disable the current source 232, and can also disable the receive circuitry 230.

Instead, other input and output blocks 332, 334 can be connected. These blocks 332, 334 can support any other desired interface(s), for example for legacy or otherwise incompatible master host devices, such as standard USB, or an analog interface for legacy 3.5 mm analog audio jacks/headsets.

Figure 10:
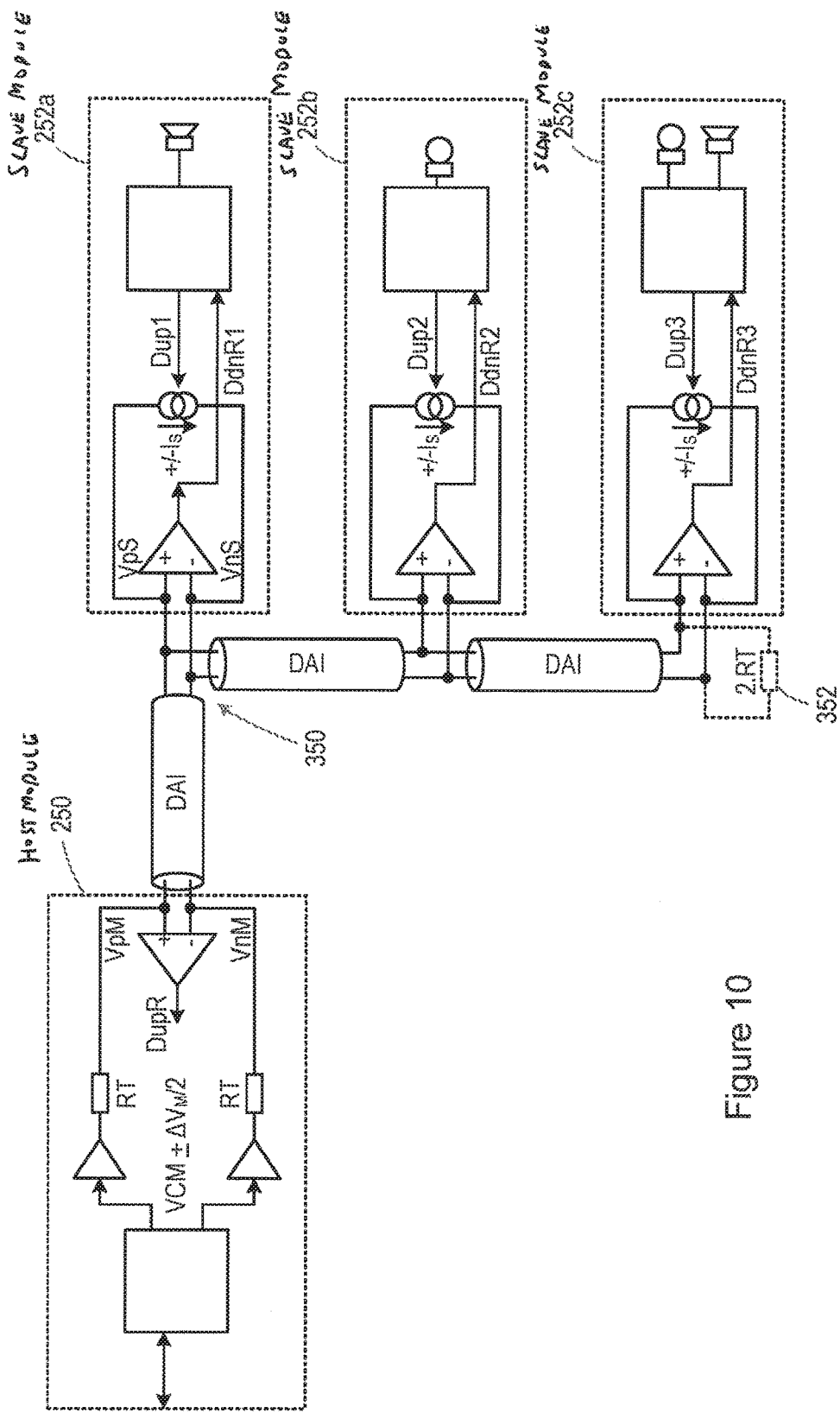
FIG. 10 illustrates a further system for transmitting and receiving data.

The invention has been described so far with reference to embodiments in which there is a single slave connected to a host. However, FIG. 10 illustrates a situation in which there are multiple slaves connected to a single host by means of a multi-drop bus 350. As an example of such a situation, the host module 250 may be in an audio codec within an audio device, and may correspond to the circuitry shown in FIGS. 6, 7 and 8. Separate slave modules 252a, 252b, 252c may be provided in devices such as microphones, speakers, or speakers with local feedback microphones for noise cancellation. Again, each slave module 252a, 252b, 252c may correspond to the circuitry shown in FIGS. 6, 7 and 8.

Each of the slave devices is allocated separate time slots for transmitting data Dup1, Dup2, Dup3 respectively to the host, and for receiving data DdnR1, DdnR2, DdnR3 respectively from the host. Calibration can ensure that the data transmitted by the different slaves is received by the host in the correct time alignment, although it is possible to schedule an empty symbol slot between the different transmissions to avoid collisions.

Where the transit time over the bus is not less than a bit period (for example where cable lengths are long, or data rates are high), a termination resistor 352 may be provided, to avoid echoes caused by signal reflection at the end of the cable.

Figure 11:
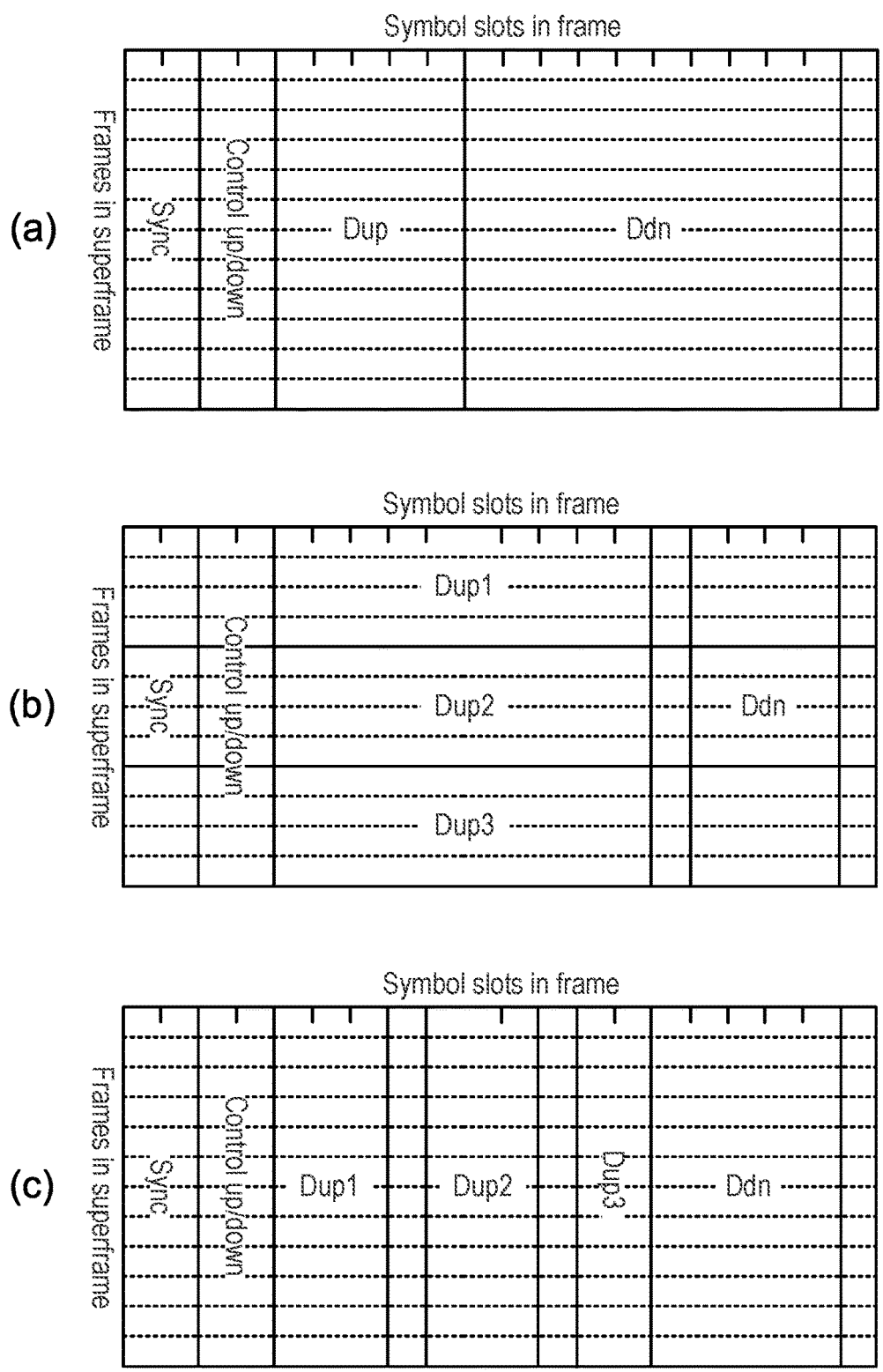
FIG. 11 illustrates signals transmitted in the system of FIG. 10.

FIG. 11 illustrates the allocation of time slots to the different slaves, in situations where a multi-drop bus is used, as shown in FIG. 10. Thus, FIG. 11(a) shows the situation with a single slave connected, and in particular shows multiple frames within a superframe, with each frame containing synchronization bits, control bits (which may be transmitted from master to slave or from slave to master), data sent from the slave to the master, and data sent from the master to the slave.

FIG. 11(b) shows a first possible arrangement on a multi-drop bus. Again, each frame includes synchronization bits and control bits (which may be transmitted from master to slave or from slave to master), and includes data sent from one of the slaves to the master, and data sent from the master to the slaves. In this example, one slave is allocated bits to transmit data in a series of successive frames, and then a different slave is allocated bits to transmit data in the next series of successive frames, and so on. The length of the series of frames can be varied as desired.

FIG. 11(c) shows a second possible arrangement on a multi-drop bus. Again, each frame includes synchronization bits and control bits (which may be transmitted from master to slave or from slave to master), and includes data sent from each of the slaves to the master, and data sent from the master to the slaves. In this example, each slave is allocated a certain number of bits in each frame, and a bit is left empty between the transmissions from the different slaves. The number of bits allocated to each slave can be varied as desired.

It will be appreciated that aspects of the arrangements shown in FIGS. 11(b) and (c) can be combined as required.

The skilled person will thus recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile telephone, an audio player, a video player, a PDA, a mobile computing platform such as a laptop computer or tablet and/or a games device for example. Embodiments of the invention may also be implemented wholly or partially in accessories attachable to a host device, for example in active speakers or headsets or the like.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. Terms such as amplify or gain include possibly applying a scaling factor of less than unity to a signal.

The invention claimed is:

1. A system comprising a first module and a second module, connected by a transmission line comprising first and second wires, wherein at first times the first module has first data to transmit and at second times the second module has second data to transmit, and wherein:
- the first module includes common mode voltage circuitry, for imposing a common mode voltage onto the first and second wires at said first times when the first module has first data to transmit and at said second times when the second module has second data to transmit;
- the first module includes signal generation circuitry, for generating a signal voltage in response to first data, and for imposing the signal voltage as a differential signal onto the first and second wires during periods when the first module has first data to transmit;
- the second module includes current generation circuitry, for generating a signal current in response to second data, wherein, in response to each bit of the second data, the second module generates a signal current having a value that depends on the value of a respective bit of the second data, and for injecting the signal current as a differential current onto the first and second wires during periods when the second module has second data to transmit;
- the first module includes respective resistances connected to the first and second wires,
- the first module includes a first detector for obtaining first output data based on voltages across the resistors resulting from the signal current injected by the current generation circuitry of the second module; and
- the second module includes a second detector for obtaining second output data based on differential signal imposed by the signal generation circuitry of the first module.

2. The system as claimed in claim 1, wherein the respective resistances of the first module comprise discrete resistors.

3. The system as claimed in claim 1, wherein the respective resistances of the first module comprise resistors co-integrated with active driver circuitry of the signal generation circuitry.

4. The system as claimed in claim 1, wherein the respective resistances connected to the first and second wires are matched to a characteristic impedance of the transmission line.

5. The system as claimed in claim 1, wherein the first module is configured to send data to the second module, and the second module is configured to send data to the first module, in each frame of a plurality of successive frames.

6. The system as claimed in claim 5, wherein the first module is configured to send control bits to the second module in a first predetermined plurality of frames in a superframe, and the second module is configured to send control bits to the first module in a second predetermined plurality of frames in the superframe.

7. The system as claimed in claim 6, wherein the first and second modules are configured to send the control bits between data sent from the first module to the second module, and data sent from the second module to the first module, such that there is a single pair of reversals of transmission direction in each frame.

8. The system as claimed in claim 5, wherein the first module is configured to send synchronization bits to the second module in each frame of a plurality of successive frames.

9. The system as claimed in claim 1, comprising a plurality of second modules.

10. The system as claimed in claim 1, wherein the first and second modules are configurable to operate with alternative respective interfaces.

11. The system as claimed in claim 1, wherein the first and second modules are provided in a single product.

12. The system as claimed in claim 1, wherein the first module is provided in a host device and the second module is provided in an accessory device.

13. The system as claimed in claim 12, wherein the accessory device is detachable from the host device.

14. A second module, for use in a system further comprising a first module, connected by a transmission line comprising first and second wires, wherein at first times the first module has first data to transmit and at second times the second module has second data to transmit, and wherein:
- the first module includes common mode voltage circuitry, for imposing a common mode voltage onto the first and second wires at said first times when the first module has first data to transmit and at said second times when the second module has second data to transmit;
- the first module includes signal generation circuitry, for generating a signal voltage in response to first data, and for imposing the signal voltage as a differential signal onto the first and second wires during periods when the first module has the first data to transmit;
- the second module includes current generation circuitry, for generating a signal current in response to second data, wherein, in response to each bit of the second data, the second module generates a signal current having a value that depends on the value of a respective bit of the second data, and for injecting the signal current as a differential current onto the first and second wires during periods when the second module has the second data to transmit;
- the first module includes respective resistances connected to the first and second wires,
- the first module includes a first detector for obtaining first output data based on voltages across the resistors resulting from the signal current injected by the current generation circuitry of the second module; and
- the second module includes a second detector for obtaining second output data based on differential signal imposed by the signal generation circuitry of the first module.

* * * * *